United States Patent
Herrmann

(10) Patent No.: US 7,167,487 B2
(45) Date of Patent: Jan. 23, 2007

(54) NETWORK WITH LOGIC CHANNELS AND TRANSPORT CHANNELS

(75) Inventor: Christoph Herrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1004 days.

(21) Appl. No.: 10/151,087

(22) Filed: May 20, 2002

(65) Prior Publication Data

US 2003/0053344 A1 Mar. 20, 2003

(30) Foreign Application Priority Data

May 21, 2001 (DE) ................. 101 24 940

(51) Int. Cl.
*H04J 3/18* (2006.01)
(52) U.S. Cl. ................................ 370/477
(58) Field of Classification Search ............. 370/337, 370/442, 338, 329, 348, 437, 469, 342, 321, 370/326, 477; 455/435.2, 403
See application file for complete search history.

(56) References Cited

U.S. PATENT DOCUMENTS 6,850,540 B1 * 2/2005 Peisa et al. ............. 370/468

OTHER PUBLICATIONS

3rd Generation Partnership Project; Technical Sspecification Group Radio Access Network; Services provided by the physical layer, (Release 1999) (3GPP TS 25.302, V3.7.0 (Dec. 2000).
3rd Generation Partnership Project; Technical Sspecification Group Radio Access Network; MAC protocol specification, (Release 1999) (3GPP TS 25.321, V3.7.0 (Mar. 2000).

* cited by examiner

*Primary Examiner*—Chi Pham
*Assistant Examiner*—Alexander O. Boakye

(57) ABSTRACT

The invention relates to a network with a first plurality of logic channels with which is associated a second plurality of transport channels,
which transport channels are provided for transmitting transport blocks formed from packet units of the logic channels, wherein a plurality of valid transport format combinations is allocated to the transport channels, which combinations indicate the transport blocks provided for transmission on each transport channel,
wherein a selection algorithm is provided for selecting the transport format combinations, and
wherein it is provided that the selection of the transport format combinations is carried out while maintaining a minimum bit rate applicable to the respective logic channel.

13 Claims, 2 Drawing Sheets

NETWORK WITH LOGIC CHANNELS AND TRANSPORT CHANNELS

The invention relates to a network with a first plurality of logic channels with which is associated a second plurality of transport channels, said transport channels being designed for the transmission of transport blocks formed from packet units of the logic channels.

Such a network is known from the $3^{rd}$ Generation Partnership Project (3GPP); Technical Specification Group (TSG) RAN; Working Group 2 (WG2); Radio Interface Protocol Architecture; TS 25.302 V3.6.0), which describes the function of the MAC layer (MAC=Medium Access Control) of a radio network. A physical layer offers transport channels or transport links to the MAC layer. The MAC layer makes logic channels or logic links available to an RLC layer (RLC=Radio Link Control). The packet units formed in the RLC layer are packed in transport blocks in the MAC layer, which blocks are transmitted from the physical layer through physical channels to a terminal, or the other way about, by the radio network control. Apart from such a multiplex or demultiplex function, the MAC layer also has the function of selecting suitable transport format combinations (TFC). A transport format combination represents a combination of transport formats for each transport channel. The transport format combination describes inter alia how the transport channels are multiplexed into a physical channel in the physical layer.

The invention has for its object to provide a network which comprises an optimized selection process for selecting a suitable transport format combination.

According to the invention, this object is achieved by means of a network with a first plurality of logic channels with which a second plurality of transport channels is associated, which transport channels are provided for transmitting transport blocks formed from packet units of the logic channels, wherein a plurality of valid transport format combinations is allocated to the transport channels, which combinations indicate the transport blocks provided for transmission on each transport channel, wherein a selection algorithm is provided for selecting the transport format combinations, and wherein it is provided that the selection of the transport format combinations is carried out while maintaining a minimum bit rate applicable to the respective logic channel.

A valid transport format combination is understood to be a combination which can be signaled. Signaling of the transport format combinations takes place by means of signaling bits which indicate to the relevant receiving side which transport format combination was used for the transmission. The number of signaling bits available for signaling is limited, in particular in wireless networks. The result of this is that not all possible transport format combinations can be signaled and are valid according to the definition given above. The number of valid transport format combinations is instead limited by the number of signaling bits which are available.

The invention is based on the idea of integrating into the selection algorithm for selecting a suitable or optimum transport format combination the condition that a minimum bit rate can be guaranteed suitable for the respective logic channels. Such a minimum bit rate is often defined by the relevant application. Thus a speech connection usually requires a constant bit rate, which thus will coincide with the given minimum bit rate here. Such minimum bit rates as characteristics of the quality of service required by an application in the logic channels are defined, for example, in the specification: $3^{rd}$ Generation Partnership Project; Technical Specification Group Services and System Aspects; "QoS Concept and Architecture" TS23.107v350.

The advantage of such an integration of the minimum bit rate requirement into the TFC selection algorithm is in particular that the two functions (TFC selection and compliance with the minimum bit rate requirement) can be implemented in a common unit of the mobile station or of the network. The implementation is possible both in software and in hardware.

The requirement to comply with the minimum bit rate is to be understood here such that it is attempted as much as possible in the selection of the TFC to maintain the minimum bit rate with respect to a given measuring interval in the selection of the TFC. Should this be impossible because of the packet units available in the individual logic channels, TFCs may alternatively be chosen which fall below the minimum bit rate.

An advantageous possibility of implementing a security function for taking into account and complying with the minimum bit rate consists in that a moving measurement window of, for example, 5 transmission time intervals TTI is provided.

A transmission time interval TTI corresponds to a number of radio frames (RF) and is equal to at least one radio frame. It indicates the number of radio frames over which the interleaving extends. Interleaving is a combination procedure in which information units (symbols) from consecutive radio frames are interwoven in time at the transmitter end. The MAC layer supplies a plurality of transport blocks to the physical layer in each transmission time interval. The transmission time interval is specific to a transport channel and belongs to the semi-static part of the transport format. When the physical layer receives a plurality of transport blocks designed for transmission through a transport channel at the start of a transmission time interval comprising n radio frames, each transport block of this plurality is subdivided into n segments (segmentation of transport blocks). The n segments of each transport block are transmitted in the n consecutive radio frames of the transmission time interval. All n radio frames of the transmission time interval will then show the same sequence of segments.

The moving measurement window for measuring the bit rate is then shifted by one TTI in a sliding fashion each time, such that the bit rate of the final 4 TTIs is measured each time. The number of transport blocks to be transmitted in the current, 5th TTI is then determined from the measured bit rate of the final 4 TTIs, such that the minimum bit rate is maintained.

A further advantage of the invention is that the determination of the minimum bit rate can take place through implementation of the sliding measurement window and that the compliance with the minimum bit rate can be achieved at the level of the MAC layer. This offers the advantage over a separate implementation of a function for monitoring the compliance with the bit rate, for example at the application level, that the measurement at the MAC layer level is more accurate, because control information added in the MAC layer and in the RLC layer (for example the MAC and RLC headers) can be directly included in the measurement because it is contained in the transport blocks.

In the advantageous embodiment of the invention as defined in claim 2, the selection algorithm for selecting a suitable or optimum transport format combination takes into account and integrates the condition that a maximum bit rate provided for the logic channels is maintained. Maintaining such a maximum bit rate for the respective individual logic channels, which are preferably scanned in succession in the allocation algorithm, ensures that logic channels of lower priority can still send packet units when the waiting lines of logic channels of higher priority contain so many packet units that logic channels of lower priority would be unable to send any packet unit at all if the maximum bit rate were not taken into account. The provision of a maximum bit rate thus ensures a distribution of the available transmission capacity in accordance with the respective maximum bit rates. Such maximum bit rates for the logic channels as properties characteristic of a quality of service desired for an application are defined, for example, in the specification 3rd Generation Partnership Project; Technical Specification Group Services and System Aspects; "QoS Concept and Architecture" TS23.107v350.

The maximum bit rates can be taken into account as an absolute upper limit in the total selection algorithm. This means that the maximum bit rate is not exceeded in the TFC last selected. The maximum bit rate, however, may be taken into account temporarily only, for example only during part of the algorithm or a partial step in the selection. It is possible in particular to lift the condition of the maximum bit rate not to be exceeded at the end of the selection algorithm and to allocate the still remaining packet units to the highest possible extent.

In the advantageous selection algorithm of claim 3, the selection algorithm first comprises an allocation sequence. In this first allocation sequence, the logic channels are utilized one after the other, and the packet units waiting in the storage units of the logic channels are allocated to the respective transport channels on the basis of two criteria each time. A packet unit allocated to a transport channel for transmission in this first allocation sequence will be taken into account at the end of the selection algorithm in each and every case, i.e. it is transmitted. This means that the quantity of valid transport format combinations allowing the transmission of the packet units allocated up to the respective moment and the transmission of the newly allocated packet units becomes successively smaller upon each allocation of packet units.

The utilization of the logic channels takes place preferably in accordance with their priorities, i.e. the logic channel of highest priority is used first, then the logic channel with the next highest priority, etc.

The first criterion taken into account is that in each case only so many packet units are allocated that the sum of the packet units allocated to the respective channel up to the present moment and the newly allocated packet units for this transport channel corresponds to a transport format which is contained in a valid transport format combination. This means that it is ensured that no empty packet units are transmitted, even if no further packet units are allocated to the transport channel any more after that. The substitution with empty packet units is often also denoted with the term "padding".

The second criterion taken into account, over which, however, the first criterion takes precedence, is that the number of the allocated packet units is chosen such that it comes as close as possible to the minimum bit rate provided for the respective logic channel in each case. If fewer packet units are available in the logic channel than are required for achieving the minimum bit rate, all packet units present are accordingly allocated, in as far as this results in a valid TFC. If more packet units are present in the logic channel than are required for achieving the minimum bit rate, only a number of packet units corresponding to the minimum bit rate is allocated, as far as possible and as far as this results in a valid TFC.

After the first allocation sequence, a further allocation sequence is provided in which a further allocation of yet remaining packet units takes place. The logic channels are once more utilized serially, preferably in order of priority.

Such a two-stage allocation has the advantage that the condition as to the minimum bit rate to be observed is integrated into the selection algorithm in the first allocation sequence, and that accordingly the minimum bit rate is guaranteed as much as possible for all logic channels. This leads to a suitable treatment of all logic channels in the allocation.

Claim 4 relates to an advantageous embodiment of the second allocation sequence. It is again provided here as a criterion of highest priority that no transmission of empty packet units (padding) is allowed.

It is attempted in complying with this criterion to allocate as many packet units as possible to the logic channels, while the maximum bit rate obtaining for each respective logic channel is not to be exceeded.

This leads to an improved tailoring to all logic channels in the allocation.

The third allocation sequence which follows the second allocation sequence differs from the first one, according to claim 5, only in that the condition as to the maximum bit rate is no longer observed. Lifting of this condition in the third sequence is advantageous if as large as possible a total number of packet units is to be transmitted. This lifting takes place not in the second allocation sequence already in this embodiment of the invention, because in that case logic channels of low priority would be disadvantaged in the allocation because of the requirement of the maximum bit rate.

It is alternatively possible, however, to end the selection algorithm after the second allocation sequence. This has the advantage that the total bit rate is lower, and thus also the required transmission power. The resulting interference with adjoining radio cells is also reduced thereby.

In the advantageous embodiment of the invention as defined in claim 6, the condition as to the maximum bit rate to be observed is lifted already in the second allocation sequence and is no longer taken into account, at least only for the final logic channel which is associated with a transport channel. The condition as to the maximum bit rate to be observed may alternatively be lifted earlier, for example for the penultimate logic channel which is associated with a transport channel. The last logic channel, in which the maximum bit rate condition is lifted, may then deliver as many packet units as possible, in as far as corresponding suitable valid transport format combinations are still available.

The invention also relates to a radio network control and to a terminal in a wireless network, as well as to a method of selecting a transport format combination.

A few embodiments of the invention will be explained in more detail below with reference to the drawing comprising FIGS. 1 and 2, wherein:

FIG. 1 shows a wireless network, for example a radio network, with a radio network controller (RNC) 1 and a plurality of terminals 2 to 9. The radio network controller 1 is responsible for the control of all components taking part in the radio traffic such as, for example, the terminals 2 to 9. An exchange of control and payload data takes place at least between the radio network controller 1 and the terminals 2 to 9. The radio network controller 1 establishes respective links for the transmission of payload data.

Figure 1:
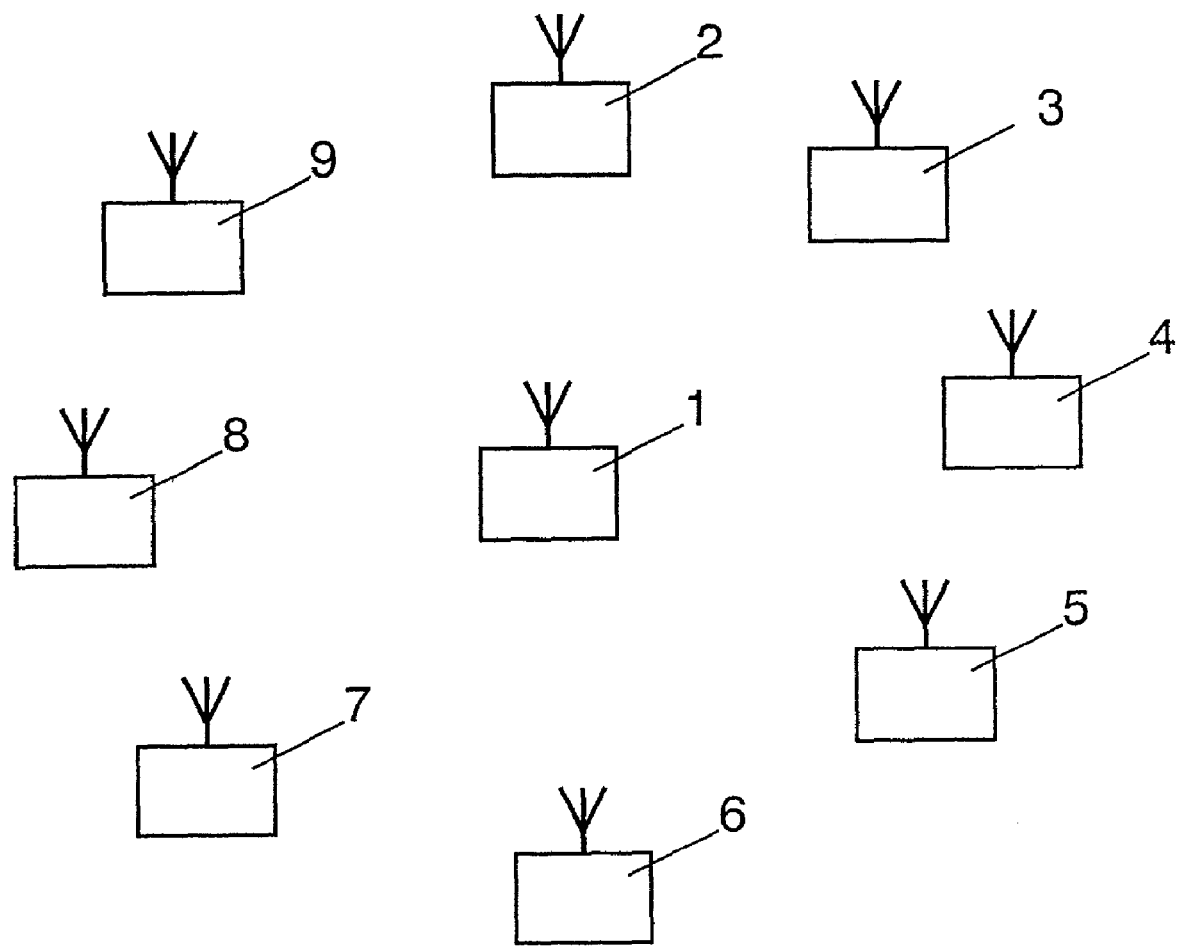
FIG. 1 shows a wireless network with a radio network control and several terminals.

Usually the terminals 2 to 9 are mobile stations, while the radio network controller 1 is fixedly installed. A radio network controller 1, however, may alternatively be displaceable or mobile in certain cases.

The wireless network serves to transmit, for example, radio signals by the FDMA, TDMA, or CDMA methods (FDMA=frequency division multiplex access, TDMA=time division multiplex access, CDMA=code division multiplex access), or in accordance with a combination of these methods.

In the CDMA method, which is a special code spreading method, binary information (data signal) originating from a user is modulated with a different code sequence each time. Such a code sequence consists of a pseudo-random square-wave signal (pseudo-noise code) whose rate, referred to as chip rate, is usually much higher than that of the binary information. The duration of a square-wave pulse of the pseudo-random square-wave signal is denoted the chip interval $T_C$. $1/T_C$ is the chip rate. The multiplication or modulation of the data signal by the pseudo-random square-wave signal leads to a spreading of the spectrum around the spreading factor $N_C=T/T_C$, where T is the duration of one square-wave pulse of the data signal.

Payload data and control data between at least one terminal (2 to 9) and the radio network controller 1 are transmitted through channels designated by the radio network controller 1. A channel is defined by a frequency range, a time range, and, for example in the CDMA method, by a spreading code. The radio link between the radio network controller 1 and the terminals 2 to 9 is denoted the downlink, and from the terminals to the base station the uplink. Data are thus sent from the base station to the terminals through downlink channels, and from terminals to the base station through uplink channels.

For example, a downlink control channel may be provided, which is used for distributing control data from the radio network controller 1 to all terminals 2 to 9 before a connection link is built up. Such a channel is denoted the downlink distribution control channel or broadcast control channel. To transmit control data before the building-up of a connection from a terminal 2 to 9 to the radio network controller 1, for example, an uplink control channel appointed by the radio network controller 1 may be used, to which, however, other terminals 2 to 9 may also have access. An uplink channel which can be used by several or all terminals 2 to 9 is denoted a common uplink channel. After a connection has been built up, for example between a terminal 2 to 9 and the radio network controller 1, payload data are transmitted through a downlink and an uplink payload channel. Channels which are built up exclusively between one transmitter and one receiver are denoted dedicated channels. Usually, a payload channel is a dedicated channel which can be accompanied by a dedicated control channel for the transmission of link-specific control data.

To achieve that payload data can be exchanged between the radio network controller 1 and a terminal, it is necessary for a terminal 2 to 9 to be synchronized with the radio network controller 1. It is known, for example, from the GSM system (GSM=Global System for Mobile communication), in which a combination of FDMA and TDMA methods is used, to determine first a suitable frequency range on the basis of given parameters and then the temporal position of a frame (frame synchronization), by means of which the time sequence for the transmission of data is obtained. Such a frame is always necessary for data synchronization of terminals and the base station in the TDMA, FDMA, and CDMA methods. Such a frame may comprise several sub-frames, or may form a superframe together with other, consecutive frames.

Figure 2:
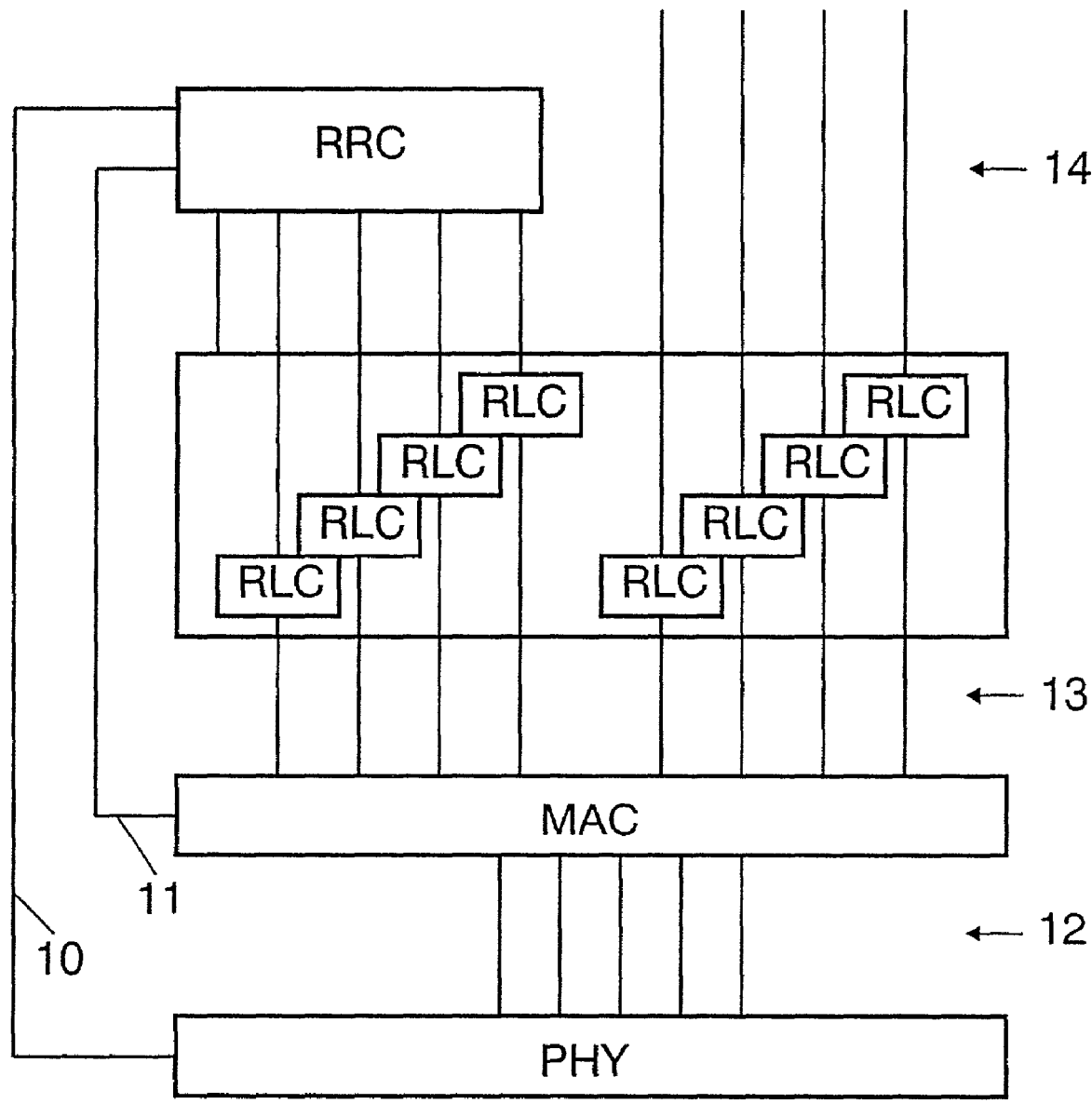
FIG. 2 shows a layer model for clarifying various functions of a terminal or a radio network control.

The exchange of control and payload data via the radio interface between the radio network controller 1 and the terminals 2 to 9 may be clarified with reference to the example of a layer model or protocol architecture as shown in FIG. 2 (cf. for example: $3^{rd}$ Generation Partnership Project (3GPP); Technical Specification Group (TSG) RAN; Working Group 2 (WG2); Radio Interface Protocol Architecture; TS 25.301 V3.6.0). The layer model comprises three protocol layers: the physical layer PHY, the data connection layer with the sub-layers MAC and RLC (FIG. 2 shows a plurality of units of the sub-layer RLC), and the layer RRC. The sub-layer MAC is responsible for the medium access control, the sub-layer RLC for the radio link control, and the layer RRC for the radio resource control. The layer RRC is responsible for signaling between the terminals 2 to 9 and the radio network controller 1. The sub-layer RLC serves to control a radio link between a terminal 2 to 9 and the radio network controller 1. The layer RRC controls the layers MAC and PHY via control lines 10 and 11. The layer RRC can control the configuration of the layers MAC and PHY in this manner. The physical layer PHY offers transport channels or transport links 12 to the MAC layer. The MAC layer makes logic channels or logic links 13 available to the RLC layer. The RLC layer is accessible to applications via access points 14.

Packet units are formed in the RLC layer and are packed in transport blocks in the MAC layer, which blocks are transmitted from the radio network controller to a terminal, or the other way about, through physical channels. Apart from such a multiplex and demultiplex function, the MAC layer also has the function of selecting suitable transport format combinations (TFC). A transport format combination represents a combination of transport formats for each transport channel. The transport format combination describes inter alia how the transport channels are multiplexed into a physical channel in the physical layer (time multiplex).

Each transport format comprises a dynamic and a semi-static part. The dynamic part describes a transport block set (TBS) which is transmitted in a transport channel during a transmission time interval (TTI), and the semi-static part comprises, for example, information about the nature of the error-correcting coding. The semi-static part will only change through a reconfiguration of the physical channel. A transport block set is defined as a plurality of transport blocks which is exchanged between the physical layer and the MAC layer. The size of a transport block is defined by the number of bits of one packet unit of the RLC layer and the number of bits of added control information (header) of the MAC layer.

The term "transport format" in the following description will be understood to denote only the dynamic part of the transport format.

A transmission time interval corresponds to a number of radio frames (RF) and is at least one radio frame. It indicates the number of radio frames over which the interleaving extends. Interleaving is a combination in time of information units (symbols) from consecutive radio frames at the transmitter end. The MAC layer supplies a transport block set to the physical layer during each transmission time interval. The transmission time interval is specific to a transport channel and belongs to the semi-static part of the transport format. When the physical layer receives a transport block set designed for transmission through a transport channel from the MAC layer at the start of a transmission time interval comprising n radio frames, each transport block of this set will be subdivided into n segments (segmentation of transport blocks). The n segments of each transport block are transmitted in the n consecutive radio frames of the transmission time interval. All n radio frames of the transmission time interval contain the same sequence of fragments then.

The MAC layer serves to select the suitable transport format for each transport channel. It is necessary in this selection to take into account the priorities of the logic channels between the RLC and MAC layers, denoted the MAC logical priority (MLP) hereinafter, the occupation of the waiting lines in the RLC layer (buffer occupancy=BO), the transmission time intervals TTI of the transport channels associated with the logic channels, and subsets of transport format combinations. A waiting line in the RLC layer contains packet units which are to be transmitted from the RLC layer through the MAC layer to the physical layer. A subset of the transport format combination is part of the possible total set of transport format combinations. Subsets are used for limiting the number of possible transport format combinations because the number of bits for signaling to the reception side which transport format combination was used for the transmission is also limited.

A transport channel (or the logic channel(s) imaged thereon) is/are denoted inactive in the radio frame if the start of the radio frame does not coincide with the start of the transmission time interval of the transport channel. It is (they are) denoted active in the opposite case. In the case of the shortest transmission time interval corresponding to the length of one radio frame of, for example, 10 ms, the associated transport channel is never inactive because a transport block will require at least this shortest transmission time interval for transmitting its data. A transport channel may indeed be inactive in this sense in the case of longer transmission time intervals (for example 20 ms).

A selection algorithm for selecting an optimum transport format combination is carried out in the MAC layer at each start of a radio frame. This algorithm may be implemented in the software or in the hardware, in the mobile station or in the network.

First a few parameters and variables are defined for the representation and clarification of the selection algorithm:

Symbols have the following meanings:

S2: the number of all transport format combinations TFC within the set TFCS of all transport format combinations which can be supported given the existing maximum transmission power of the mobile station.

TF(t): a number of transport blocks of given size which are transmitted through transport channel TC t, with t=1, ..., $N_{TC}$, and $N_{TC}$ is the number of transport channels.

A transport format combination TFC is defined here as TFC=(TF(1), TF(2), ..., TF($N_{TC}$)), for which it is ignored that a transport format in addition comprises semi-static attributes, for example the method of error correction coding.

BO(L): the buffer occupancy BO of the logic channel LC L, with L=1, ..., $N_{LC}$, where $N_{LC}$ represents the number of logic channels.

The logic channels are numbered here in order of decreasing priority, i.e. LC 1 has the highest priority and LC $N_{LC}$ has the lowest priority: the lower the number, the higher the priority.

Logic channels with different but adjoining numbers may have the same priority.

If logic channels of the same priority (i.e. adjoining numbers) are present, and are imaged on transport channels which are active at the same time, the fairness of allocation may be optimized in that the logic channels are cyclically shifted in position from one TTI to the next: if LC 3, 4, and 5 have the same priority, the sequence at the start of the first TTI would be 3, 4, 5, in the next TTI 3*=4, 4*=5, 5*=3, and so on. It is achieved thereby that not always the same logic channel at this level of priority is scanned first at the start of a TTI.

Further meanings of symbols:

$S_{LogCh}(t)$: the number of logic channels (identified by their numbers) which are imaged on the same transport channel TC t.

$S_{LogCh}(t, L)$: the list of logic channels (identified by their numbers) which are imaged on the same transport channel TC t, starting with LC 1 and in rising numbers up to but not including LC L.

t(L): the transport channel TC t on which LC L is imaged.

N(L): the number of transport blocks allocated to LC L as part of TF(t(L)) in one TFC.

A transport block comprises a number of bits defined by the transport block size.

minBr and maxBr denote the minimum and maximum admissible bit rate, respectively, with respect to a given observed time period. minBr and maxBr serve to determine further quantities which are defined below.

The average bit rate $R_{average}$ is defined on the basis of a "window" with size W:

$$R_{average} := \frac{s_{Bits}(l, W, L)}{W}, \text{ with}$$

$$s_{Bits}(l, W, L) := \sum_{k=\max(0, l-W+1)}^{l} N(k, L) \cdot \text{blocksize}.$$

in which $S_{Bits}(l, W, L)$ indicates the number of bits which were transmitted by LC L during the last W TTIs—counting from the $l^{th}$ TTI since the transmission was started on LC L. N(k,L) here denotes the number of transport blocks of LC L which were allocated for the transmission in TTI k. (If l<W, i.e. at the start of the transmission, the viewing interval is obviously only l TTIs.)

$N_{min}(l,L)$ denotes the smallest number of transport blocks that can be allocated to the LC L for transmission in the $l^{th}$ TTI, such that the average bit rate $R_{average(l)^{min}}$ with respect to the W preceding TTIs up to the $l^{th}$ TTI does not fall below the value minBr.

$N_{max}(l,L)$ denotes the greatest number of transport blocks that can be allocated to the LC L for transmission in the $l^{th}$ TTI, such that the average bit rate $R_{average(l)^{max}}$ with respect to the W preceding TTIs up to the $l^{th}$ TTI does not fall below the value maxBr.

Given certain values for minBr and maxBr, these definitions lead to the following conditions for $N_{min}(l,L)$ and $N_{max}(l,L)$:

$$R_{average}^{min}(l) := \frac{s_{Bits}(l-1, W-1, L) + N_{min}(l, L) \cdot \text{blocksize}}{W} \geq \text{minBr}$$

$$R_{average}^{max}(l) := \frac{s_{Bits}(l-1, W-1, L) + N_{max}(l, L) \cdot \text{blocksize}}{W} \geq \text{maxBr}$$

$$\Rightarrow N_{min}(l, L) = \text{ceil}\left(\frac{\text{minBr} \cdot W - s_{Bits}(l-1, W-1, L)}{\text{blocksize}}\right)$$

$$\Rightarrow N_{max}(l, L) = \text{floor}\left(\frac{\text{maxBr} \cdot W - s_{Bits}(l-1, W-1, L)}{\text{blocksize}}\right)$$

in which floor(x):=$\lfloor x \rfloor$ is the highest integer number smaller than or equal to x, and ceil(x):=$\lceil x \rceil$ is the smallest integer number greater than or equal to x.

The selection algorithm now preferably proceeds in the following steps:

1. Determine for each logic channel LC L the lowest number of blocks $N_{min}(L)$ that can be transported in the present TTI (while forming a moving sum over the W last TTIs) without falling below the minimum bit rate for the channel LC L.

Determine for each logic channel LC L the greatest number of blocks $N_{max}(L)$ that can be transported in the present TTI (while forming a moving sum over the W last TTIs) without the maximum bit rate for the channel LC L being exceeded.

2. Set the iteration variable ITEFR for 1.
   Now the following loop is traversed:

3. Set L:=1.

4. Set S1:=S2 (S2 as defined above).

5. If ITER==1 (minBr condition):
   Form S2 as the number of the transport format combinations TFC in S1 which contain a number of transport blocks waiting in the waiting line of LC L and coming closest to the value $N_{min}(L)$ or (with the use of padding blocks) which contain more than this number—while taking into account all allocated transport blocks of logic channels already inspected which are imaged on the same transport channel (i.e. contained in $S_{LogCh}(t(L),L)$. Formally, S2 (in dependence on L) is given by $$S_2 = \left\{ TFC \in S_1 \mid TF(t(L)) \geq N_1(L) + \sum_{l \in S_{LogCh(t(L),L)}} N_1(l) =: \theta, \right.$$

in which $N_1(L)$ is
for BO(L)<$N_{min}$(L): the highest number ($\leq$min(BO(L), $N_{min}$(L))),
for BO(L)$\geq N_{min}$(L): the smallest number (<$N_{max}$(L)) of transport blocks present in the waiting line of LC L which does not fall below $N_{min}$(L), such that θ results in a transport format TF(t(L)) for TCt(L) contained in TFC, i.e. no padding transport blocks are necessary.}
$N_1$(L) is stored in the variable N[L].

If ITER==2 (maxBr condition):
Form S2 as the number of transport format combinations TFC in S1 which contain the highest number [$\leq$min (BO(L), $N_{max}$(L))–$N_1$(L)] of transport blocks waiting in the waiting line of LC L or (if padding blocks are added) more than this number—while taking into account all allocated transport blocks of logic channels already inspected which are imaged on the same transport channel (i.e. contained in $S_{LogCh}(t(L),L)$) as well as all transport blocks allocated in the first iteration. Formally, S2 (in dependence on L) is given by $$S_2 = \{TFC \in S_1 \mid TF(t(L)) \geq \Delta N_2(L) + \sum_{l \in S_{LogCh(t(L),L)}} \Delta N_2(l) + \sum_{l \in S_{LogCh(t)}} N_1(l) =: \theta,$$

in which $\Delta N_2$(L) is the highest number ($\leq$min(BO(L), $N_{max}$(L))–$N_1$(L)) of transport blocks waiting in the waiting line of LC L, such that θ results in a transport format TF(t(L)) for TCt(L) which is contained in TFC, i.e. no padding transport blocks are necessary.}
$\Delta N_2$(L) wird zur Variablen N[L].
The condition $\Delta N_2(L) \leq$min(BO(L), $N_{max}(L))-N_1(L)$ ensures that the maximum data rate for LC L is not exceeded when a further $\Delta N_2$(L) transport blocks are allocated, because it also follows from this condition that $\Delta N_2(L)+N_1(L) \leq$min(BO(L), $N_{max}$(L)).

If ITER==3 (optional: may be omitted because it softens the maxBr condition):
AND "for at least one logic channel L* is N[L*]<BO (L*))"
AND "S1 contains more than one element".
Form S2 as the number of transport format combinations TFC in S1 which contain the highest number [$\leq$BO (L)–($N_1(L)+\Delta N_2(L)$)] of transport blocks waiting in the waiting line of LC L or (if padding blocks were added) more than this number—while taking into account all allocated transport blocks of logic channels already inspected which are imaged on the same transport channel (i.e. contained in $S_{LogCh}(t(L),L)$) as well as all transport blocks allocated in the first and second iterations. Formally, S2 (in dependence on L) is given by:

$$S_2 = \{TFC \in S_1 \mid TF(t(L)) \geq \Delta N_3(L) + \sum_{l \in S_{LogCh(t(L),L)}} \Delta N_3(l) + \sum_{l \in S_{LogCh(t)}} \{N_1(l) + \Delta N_2(l)\} =: \theta,$$

in which $\Delta N_3$(L) is the highest number ($\leq$BO(L)–($N_1(L)+\Delta N_2(L)$))) of transport blocks waiting in the waiting line of LC L, such that θ results in a transport format TF(t(L)) for TCt(L) contained in TFC, i.e. without the insertion of padding transport blocks.}
$\Delta N_3$(L) is added to the variable N[L].

6. Set L:=L+1.

7. If L>$N_{LC}$ AND ITER>3,
   Select one of the transport format combinations TFC in S2 such that the lowest possible bit rate is achieved thereby, and terminate the procedure.

It is noted that the selected transport format combination also results in the following form:

$$\left( \sum_{L \in S_{LogCh(1)}} N[L], \sum_{L \in S_{LogCh(2)}} N[L], \ldots, \sum_{L \in S_{LogCh(N_{TC})}} N[L] \right)$$

If L>$N_{LC}$ AND ITER$\leq$3
Set ITER:=ITER+1.
Continue the Algorithm with Step 3.
If L$\leq N_{LC}$ AND ITER$\leq$3

Continue the Algorithm with Step 4.

It is noted that the "best effort" traffic as a rule is not characterized by a maximum bit rate which must not be exceeded. The best effort traffic should accordingly be given the lowest priority (without bit rate limitation). The remaining space in the TFCs would then be used for this type of traffic, so that no third iteration is required.

The procedure following the selection algorithm described above will now be explained with reference to an example.

Let us assume that there are 6 logic channels LC 1 to LC 6 which are imaged on different transport channels TC 1 to TC 3. The following Table shows the allocations between LCs and TCs as well as the buffer occupancies (BO) at the start of a transmission time interval (TTI) and the values for the minimum bit rate $N_{min}$ and the maximum bit rate $N_{max}$ determined for the transmission time interval considered in accordance with the equations given above. In addition, min(BO, $N_{min}$), min(BO, $N_{max}$) are listed because they are required in the calculations involved:

| LC | TC | BO | $N_{min}$ | $N_{max}$ | min(BO, $N_{min}$) | min(BO, $N_{max}$) |
|----|----|----|-----------|-----------|---------------------|---------------------|
| 1  | 1  | 4  | 2         | 3         | 2                   | 3                   |
| 2  | 1  | 2  | 3         | 4         | 2                   | 2                   |
| 3  | 2  | 3  | 1         | 2         | 1                   | 2                   |
| 4  | 3  | 8  | 2         | 4         | 2                   | 4                   |
| 5  | 2  | 5  | 2         | 2         | 2                   | 2                   |
| 6  | 3  | 9  | 6         | 8         | 6                   | 8                   |

The set of transport format combinations which can be supported at the given transmission power on the three transport channels is written as:

$$S1=\{0, 1, 2, 3, 5, 6, 7\} \times \{0, 1, 2, 3, 4, 5, 6, 7\} \times \{0, 4, 6, 8, 10, 11, 12, 13\}$$

Iteration 1 (consideration of the minBr condition only) yields the following for the individual logic channels, while the condition B(L) to be fulfilled is given by: "$N_1(L)$ is the number of transport blocks present of LC L which comes as close as possible to min(BO(L), $N_{min}(L)$), such that θ corresponds to a valid transport format (without taking into account the semi-static attributes here) for the TC t(L)."

For L=1 it holds that: S2={TFC∈S1|TF(1)≧$N_1$(1)=:θ, B(L=1) fulfilled}={2, 3, 5, 6, 7}×{0, 1, 2, 3, 4, 5, 6, 7}×{0, 4, 6, 8, 10, 11, 12, 13}, because BO(1)≧$N_{min}$(1), $N_1$(1)≧$N_{min}$(1)=2 and θ=$N_1$(1)=2 yields a valid transport format TF(1)∈{2, 3, 5, 6, 7}, $N_1$(1)=2.

N[1]=$N_1$(1)=2 is stored.

It is set for the next step that: S1:=S2.

For L=2 it holds that: S2={TFC∈S1|TF(1)≧$N_1$(2)+$N_1$(1)=: θ, B(L=2) fulfilled)}{3,5,6,7}×{0, 1, 2, 3, 4, 5, 6, 7}×{0, 4, 6, 8, 10, 11, 12, 13}, because of BO(2)<$N_{min}$(2) to be considered: $N_1$(2)≦min(BO(2), $N_{min}$(2))=2 and θ=$N_1$(2)+$N_1$(1)=1+2 yields a valid transport format TF(1)∈{2, 3, 5, 6, 7}, so $N_1$(2)=1.

N[2]=$N_1$(2)=1 is stored.

It is set for the next step: S1:=S2.

For L=3 it holds that S2={TFC∈S1|TF(2)≧$N_1$(3)=:θ, B(L=3) fulfilled}{3, 5, 6, 7}×{1, 2, 3, 4, 5, 6, 7}×{0, 4, 6, 8, 10, 11, 12, 13}, because BO(3)≧$N_{min}$(3), $N_1$(3)≧$N_{min}$(3)=1 and θ=$N_1$(3)=1 yields a valid transport format TF(2)∈ {0, 1, 2, 3, 4, 5, 6, 7}, so $N_1$(3)=1.

N[3]=$N_1$(3)=1 is stored.

It is set for the next step: S1:=S2.

For L=4 it holds that: S2={TFC∈S1|TF(2)≧$N_1$(4)=:θ, B(L=4) fulfilled}{3, 5, 6, 7}×{1, 2, 3, 4, 5, 6, 7}×{4, 6, 8, 10, 11, 12, 13}, because BO(4)≧$N_{min}$(4), $N_1$(4)≧$N_{min}$(4)=2 and θ=$N_1$(4)=4 yields a valid transport format TF(3)∈{0, 4, 6, 8, 10, 11, 12, 13}, $N_1$(4)=4

N[4]=$N_1$(4)=4 is stored.

It is set for the next step: S1:=S2.

For L=5 it holds that: S2={TFC∈S1|TF(2)≧$N_1$(5)+$N_1$(3)=: θ, B(L=5) fulfilled}={3, 5, 6, 7}×{3, 4, 5, 6, 7}×{4, 6, 8, 10, 11, 12, 13}, because BO(5)≧$N_{min}$(5), $N_1$(5)≧$N_{min}$(5)= 2 and θ=$N_1$(5)+$N_1$(3)=2+1 yield valid transport format TF(2)∈{1, 2, 3, 4, 5, 6, 7}, so $N_1$(5)=2.

N[5]=$N_1$(5)=2 is stored.

It is set for the next step: S1:=S2.

For L=6 it holds that: S2={TFC∈S1|TF(3)≧$N_1$(6)+$N_1$(4)=: θ, B(L=6) fulfilled}={3, 5, 6, 7}×{3, 4, 5, 6, 7}×{10, 11, 12, 13}, because BO(6)≧$N_{min}$(6), $N_1$(6)≧$N_{min}$(6)=6 and θ=$N_1$(6)+$N_1$(4)=6+4 yields a valid transport format TF(3) ∈{4, 6, 8, 10, 11, 12, 13}, so $N_1$(6)=6.

N[6]=$N_1$(6)=6 is stored.

It is set for the next step: S1:=S2.

Thus $N_1$(1)+$N_1$(2)=2+1=3 transport blocks were allocated to TC 1, $N_1$(3)+$N_1$(5)=1+2=3 transport blocks were allocated to TC 2, and $N_1$(4)+$N_1$(6)=4+6=10 transport blocks were allocated to TC 3, i.e. the transport format combination determined in the first iteration is (3, 3, 10), in conformity with the transport format combination contained in S2 which generates the smallest bit rate. Because of the insufficient buffer occupancy at LC 2, (5, 3, 10) is not achieved.

The maxBr condition is taken into account in the next iteration, in which the condition B(L) to be fulfilled now is: "$\Delta N_2(L)$ is the highest number of transport blocks present of LC L which does not exceed min(BO(L), $N_{max}(L)$)−$N_1(L)$, so that θ corresponds to a valid transport format (here without taking into account the semi-static attributes) for the TC t(L)."

For L=1 it holds that: S2={TFC∈S1|TF(1)≧$\Delta N_2$(1)+$N_1$(1)+$N_1$(2)=:θ, B(L=1) fulfilled}={3, 5, 6, 7}×{3, 4, 5, 6, 7}×{10, 11, 12, 13}, because $\Delta N_2$(1)≦min(BO(1), $N_{max}$(1))−$N_1$(1)=3−2=1 and θ=$\Delta N_2$(1)+$N_1$(1)+$N_1$(2)=1+2+1 yields on valid transport format TF(1)∈{3, 5, 6, 7}, so $\Delta N_2$(1)=0.

N[1]=$N_1$(1)+$\Delta N_2$(1)=2+0=2 is stored (unchanged).

It is set for the next step: S1:=S2.

For L=2 it holds that: S2={TFC∈S1|TF(1)≧$\Delta N_2$(2)+$\Delta N_2$(1)+$N_1$(1)+$N_1$(2)=:θ, B(L=2), fulfilled}={3, 5, 6, 7}×{3, 4, 5, 6, 7}×{10, 11, 12, 13}, because $\Delta N_2$(2)≦min(BO(2) $N_{max}$(2))−$N_1$(2)=2−1=1 and θ=$\Delta N_2$(2)+$\Delta N_2$(1)+$N_1$(1)+$N_1$(2)=1+2+1 yields no valid transport format TF(1)∈{3, 5, 6, 7 }, so $\Delta N_2$(2)=0

N[2]=$N_1$(2)+$\Delta N_2$(2)=1+0=1 is stored (unchanged).

It is set for the next step: S1:=S2.

For L=3 it holds that: S2={TFC∈S1|TF(2)≧$\Delta N_2$(3)+$N_1$(3)+$N_1$(5): θ, B(L=3) fulfilled}={3, 5, 6, 7}×{4, 5, 6, 7}×{10, 11, 12, 13}, because $\Delta N_2$(3)≦min(BO(3), $N_{max}$(3))−$N_1$(3)=2−1=1 and θ=$\Delta N_2$(3)+$N_1$(3)+$N_1$(5)=1+1+2=4 yields a valid transport format TF(1)∈{3, 4, 5, 6, 7}, so $\Delta N_2$(3)= 1.

N[3]=$N_1$(3)+$\Delta N_2$(3)=1+1=2 is stored.

It is set for the next step: S1:=S2.

For L=4 it holds that: S2={TFC∈S1|TF(3)≧$\Delta N_2(4)+N_1(4)+N_1+N_1(6)$=: θ, B(L=4)fulfilled}={3, 5, 6, 7}×{4, 5, 6, 7}×{10, 11, 12, 13}, because $\Delta N_2(4) \leq \min(BO(4), N_{max}(4))-N_1(4)$=4−4=0 d.h. $\Delta N_2(4)=0$ N[4]=$N_1(4)+\Delta N_2(4)$=4+0=4 is stored (unchanged).

It is set for the next step: S1:=S2.

For L=5 it holds that S2={TFC∈S1|TF(2)≧$\Delta N_2(5)+\Delta N_2(3)+N_1(3)+N_1(5)$=: θ, B(L=5) fulfilled}={3, 5, 6, 7}×{4, 5, 6, 7}×{10, 11, 12, 13}, because $\Delta N_2(5) \leq \min(BO(5), N_{max}(5))-N_1(5)$=2−2=0, i.e. $\Delta N_2(5)=$ N[5]=$N_1(5)+\Delta N_2(5)$=2+0=2 is stored (unchanged).

It is set for the next step: S 1:=S2.

For L=6 it holds that: S2={TFC∈S1|TF(3)≧$\Delta N_2(6)+\Delta N_2(4)+N_1(4)+N_1(6)$=: θ, B(L=6) fulfilled}={3, 5, 6, 7}×{4, 5, 6, 7}×{12, 13}, because $\Delta N_2(6) \leq \min(BO(6), N_{max}(6))-N_1(6)$=8−6=2 and θ=$\Delta N_2(6)+\Delta N_2(4)+N_1(4)+N_1(6)$=2+0+4+6=12 yield a valid transport format TF(3)∈{10, 11, 12, 13}.

N[6]=$N_1(6)+\Delta N_2(6)$=6+2=8 is stored.

It is set for the next step: S1:=S2.

Thus $N_1(1)+\Delta N_2(1)+N_1(2)+\Delta N_2(2)$=2+0+1+0=3 transport blocks were allocated to TC 1, $N_1(3)+\Delta N_2(3)+N_1(5)+\Delta N_2(5)$=1+1+2+0=4 transport blocks to TC 2, and $N_1(4)+\Delta N_2(4)+N_1(6)+\Delta N_2(6)$=4+0+6+2=12 transport blocks to TC 3, i.e. the transport format combination determined in the second iteration is (3, 4, 12) in conformity with the transport format combination contained in S2 which generates the smallest bit rate. The second iteration does not result in (4, 4, 12) because TC 1 does not contain the transport format "4 blocks", while $N_{max}(1)$=3 could indeed lead to a sum of 4 allocated blocks.

It is attempted in the third iteration to allocate transport blocks in excess of the maxBr condition. The condition B(L) to be fulfilled now is: "$\Delta N_3(L)$ is the highest number of transport blocks present of LC L which does not exceed $BO(L)-(N_1(L)+\Delta N_2(L))$, such that θ corresponds to a valid transport format (without taking into account the semi-static attributes here) for the TC t(L)."

For L=1 it holds that: S2={TFC∈S1|TF(1)≧$\Delta N_3(1)+\Delta N_2(1)+\Delta N_2(2)+N_1(1)+N_1(2)$=: θ, B(L=1) fulfilled}={5, 6, 7}×{4, 5, 6, 7}×{12, 13}, because $\Delta N_3(1) \leq BO(1)-(N_1(1)+\Delta N_2(1))$=4−2=2 and θ=$\Delta N_3(1)+\Delta N_2(1)+\Delta N_2(2)+N_1(1)+N_1(2)$=2+0+0+2+1=5 yields a valid transport format TF(1)∈{3, 5, 6, 7}, so $\Delta N_3(1)$=2.

N[1]=$N_1(1)+\Delta N_2(1)+\Delta N_3(1)$=2+0+2=4 is stored.

It is set for the next step: S1:=S2.

For L=2 it holds that: S2={TFC∈S1|TF(1)≧$\Delta N_3(2)+\Delta N_3(1)+\Delta N_2(1)+\Delta N_2(2)+N_1(1)+N_1(2)$=: θ, B(L=2) fulfilled}={6, 7}×{4, 5, 6, 7}×{12, 13}, because $\Delta N_3(2) \leq BO(2)-(N_1(2)+\Delta N_2(2))$=2−1=1 and θ=$\Delta N_3(2)+\Delta N_3(1)+\Delta N_2(1)+\Delta N_2(2)+N_1(1)+N_1(2)$=1+2+0+0+2+1=6 yields a valid transport format TF(1)∈{5, 6, 7}, so $\Delta N_3(2)$=1.

N[2]=$N_1(2)+\Delta N_2(2)+\Delta N_3(2)$=1+0+1=2 is stored.

It is set for the next step: S1:=S2.

For L=3 it holds that: S2={TFC∈S1|TF(2)≧$\Delta N_3(3)+\Delta N_2(3)+\Delta N_2(5)+N_1(3)+N_1(5)$=: θ, B(L=3) fulfilled}={6, 7}×{5, 6, 7}×{12, 13}, because $\Delta N_3(3) \leq BO(3)-(N_1(3)+\Delta N_2(3))$=3−(1+1)=1 and θ=$\Delta N_3(3)+\Delta N_2(3)+\Delta N_2(5)+N_1(3)+N_1(5)$=1+1+0+1+2=5 yields a valid transport format TF(1)∈{4, 5, 6, 7}, i.e. $\Delta N_3(3)$=1.

N[3]=$N_1(3)+\Delta N_2(3)+\Delta N_3(3)$=1+1+1=3 is stored.

It is set for the next step: S1:=S2.

For L=4 it holds that: S2={TFC∈S1|TF(3)≧$\Delta N_3(4)+\Delta N_2(4)+N_1(4)+\Delta N_2(6)+N_1(6)$=: θ, B(L=4) fulfilled}={6, 7}×{5, 6, 7}×{13}, because $\Delta N_3(4) \leq BO(4)-(N_1(4)+\Delta N_2(4))$=8−(4+0)=4 and θ=$\Delta N_3(4)+\Delta N_2(4)+N_1(4)+\Delta N_2(6)+N_1(6)$=1+0+4+2+6=13 yields a valid transport format TF(1)∈{12, 13}, i.e. $\Delta N_3(4)$=1.

N[4]=$N_1(4)+\Delta N_2(4)+\Delta N_3(4)$=4+0+1=5 is stored.

It is set for the next step: S1:=S2.

For L=5 it holds that: S2={TFC∈S1|TF(2)≧$\Delta N_3(5)+\Delta N_3(3)+\Delta N_2(3)+\Delta N_2(5)+N_1(3)+N_1(5)$=: θ, B(L=5) fulfilled}={6, 7}×{7}×{13}, because $\Delta N_3(5) \leq BO(5)-(N_1(5)+\Delta N_2(5))$=5−(2+0)=3 and θ=$\Delta N_3(5)+\Delta N_3(3)+\Delta N_2(3)+\Delta N_2(5)+N_1(3)+N_1(5)$=2+1+1+0+1+2=7 yields a valid transport transport format TF(1)∈{5, 6, 7}, i.e. $\Delta N_3(5)$=2.

N[5]=$N_1(5)+66 N_2(5)+\Delta N_3(5)$=2+0+2=4 is stored.

It is set for the next step: S1:=S2.

For L=6 it holds that: S2={TFC∈S1|TF(3)≧$\Delta N_3(6)+\Delta N_3(4)+\Delta N_2(4)+N_1(4)+\Delta N_2(6)+N_1(6)$=: θ, B(L=6) fulfilled}={6, 7}×{7}×{13}, because $\Delta N_3(6) \leq BO(6)-(N_1(6)+\Delta N_2(6))$=9−(6+2)=1 and θ=$\Delta N_3(6)+\Delta N_3(4)+\Delta N_2(4)+N_1(4)+\Delta N_2(6)+N_1(6)$=1+1+0+4+2+6=14 yields no valid transport format TF(1)∈{13 }, i.e. $\Delta N_3(6)$=0.

N[6]=$N_1(6)+\Delta N_2(6)+\Delta N_3(6)$=6+2+0=8 is stored.

It is set for the next step: S1:=S2.

Thus TC1 has become $N_1(1)+\Delta N_2(1)+\Delta N_3(1)+N_1(2)+\Delta N_2(2)+\Delta N_3(2)$=2+0+2+1+0+1=6 transport blocks, TC2 has become $N_1(3)+\Delta N_2(3)+\Delta N_3(3)+N_1(5)+\Delta N_2(5)+\Delta N_3(5)$ = 1+1+1+2+0+2=7 transport blocks, and TC3 has a became $N_1(4)+\Delta N_2(4)+\Delta N_3(4)+N_1(6)+\Delta N_2(6)+\Delta N_3(6)$=4+0+1+6+2+0=13 transport blocks, i.e. the transport format combination determined in the third iteration is (6, 7, 13) in conformity with the transport combination contained in S2 which generates the smallest bit rate.

The invention claimed is:

1. A network with a first plurality of logic channels with which is associated a second plurality of transport channels, which transport channels are provided for transmitting transport blocks formed from packet units of the logic channels, wherein a plurality of valid transport format combinations is allocated to the transport channels, which combinations indicate the transport blocks provided for transmission on each transport channel, wherein a selection algorithm is provided for selecting the transport format combinations, and wherein the selection algorithm uses a minimum bit rate criteria applicable to the respective logic channel.

2. The network as claimed in claim 1, wherein the network is provided to carry out the selection of the transport format combinations while taking into account a maximum bit rate obtaining for the respective logic channel.

3. The network as claimed in claim 1, wherein logic channels having different priorities are each imaged on exactly one transport channel, and in that the network is designed for carrying out the allocation of the packet units in order of priority of the logic channels.

4. The network as claimed in claim 1, wherein the network comprises a wireless network with a radio network controller and a plurality of associated terminals which are each designed for transmitting transport blocks formed from packet units of a logic channel over a transport channel which has a transmission time interval of at least one radio frame and which is active when the start of its transmission time interval coincides with that of a radio frame.

5. The network as claimed in claim 4, wherein the MAC layer (MAC=Medium Access Control) of the radio network controller or of a terminal is designed for selecting the respective transport formats.

6. The network as claimed in claim 4, wherein an RLC layer (RLC=Radio Link Control) of the radio network controller or of a terminal is designed f& storing packet units provided for transmission, and the MAC layer is designed for forming a transport block from a packet unit supplied through a logic channel.

7. A network with a first plurality of logic channels associated a second plurality of transport channels, wherein the transport channels transmit transport blocks formed from pocket units of the logic channels and have plurality of valid transport format combinations, the combinations indicate the transport blocks for transmission on each transport channel, wherein a selection algorithm is used to select the transport format combinations, wherein a first allocation sequence is provided for the selection algorithm, by means of which packet units of the logic channels are allocated to the transport channels, wherein the allocation takes place in accordance with the following criteria for the individual logic channels:
 a) only so many packet units are allocated each time that the sum of the total number of packet units allocated to the respective transport channel, also taking into account logic channels already considered and imaged on the same transport channel, corresponds to a transport format belonging to a valid transport format combination,
 b) the number of the allocated packet units is chosen such each time that it comes as close as possible to a minimum bit rate obtaining for the respective logic channel,
 while the criterion a) takes precedence over the criterion b), and wherein a second allocation sequence is provided for allocating further packet units.

8. The network as claimed in claim 7, wherein the second allocation sequence for allocating further packet units is carried out in accordance with the following criteria:
 a) only so many packet units are allocated each time that the sum of the total number of packet units allocated to the respective transport channel, also taking into account logic channels already considered and imaged on the same transport channel, corresponds to a transport format belonging to a valid transport format combination,
 c) the number of the allocated packet units is chosen such each time that it does not exceed the maximum bit rate obtaining for the respective logic channel,
 d) as many packet units as possible are allocated in each case,
 while the criterion a) takes precedence over the criteria c) and d), and the criterion c) takes precedence over the criterion d).

9. The network as claimed in claim 8, wherein a third allocation sequence for allocating further packet units is provided in accordance with the following criteria:
 a) only so many packet units arc allocated each time that the sum of the total number of packet units allocated to the respective transport channel, also taking into account logic channels already considered and imaged on the same transport channel, corresponds to a transport f&mat belonging to a valid transport format combination,
 d) as many packet units as possible arc allocated in each case, while the criterion a) takes precedence over the criterion d).

10. The network as claimed in claim 7, wherein the second allocation sequence for allocating further packet units is carried out in accordance with the following criteria:
 a) only so many packet units are allocated each time that the sum of the total number of packet units allocated to the respective transport channel, also taking into account logic channels already considered and imaged on the same transport channel, corresponds to a transport format belonging to a valid transport format combination,
 c) the number of the allocated packet units is chosen such each time that it does not exceed the maximum bit rate obtaining for the respective logic channel,
 d) as many packet wilts as possible are allocated in each case,
 while the criterion a) takes precedence over the criteria c) and d), and the criterion c takes precedence over the criterion d), and
 wherein the criterion c) is lifted each time for the last logic channel (for the last logic channels) allocated to a transport channel.

11. A radio network controller for a network with a first plurality of logic channels with which is associated a second plurality of transport channels, wherein the radio network controller is designed for forming transport blacks from packet units of the logic channels and for transmitting the transport blocks through the transport channels, wherein a number of valid transport format combinations is allocated to the transport channels, which combinations indicate the transport blocks designed for transmission for each transport channel, wherein a selection algorithm is provided in the radio network controller for selecting the transport format combinations, and wherein it is provided that the selection of the transport format combinations is carried out while taking into account a minimum bit rate obtaining for the respective logic channel.

12. A terminal for a network with a first plurality of logic channels with which is associated a second plurality of transport channels, wherein the terminal is designed for transmitting transport blocks formed from packet units of the logic channels, wherein a number of valid transport format combinations is allocated to the transport channels, which combinations indicate the transport blocks designed for transmission for each transport channel, wherein a selection algorithm is provided for selecting the transport format combinations, and wherein it is provided that the selection of the transport format combinations is carried out while taking into account a minimum bit rate obtaining for the respective logic channel.

13. A method of controlling a network with a first plurality of logic channels with which is associated a second plurality of transport channels, which transport channels are provided for transmitting transport blocks formed from packet units of the logic channels, wherein a plurality of valid transport format combinations is allocated to the transport channels, which combinations indicate the transport blocks provided for transmission on each transport channel, wherein a selection algorithm is provided for selecting the transport format combinations, and wherein the selection algorithm uses a minimum bit rate criteria applicable to the respective logic channel.

* * * * *